Figure 1:
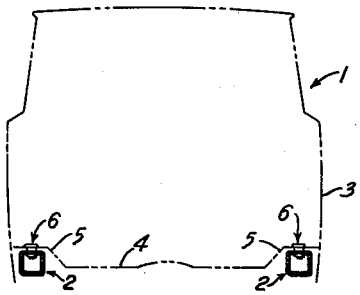

Oct. 1, 1963  A. G. SCHILBERG  3,105,717
BODY-TO-FRAME MOUNTING
Filed Dec. 15, 1961

INVENTOR
ARNOLD G. SCHILBERG, DECEASED
BY IRENE G. SCHILBERG, ADMINISTRATRIX

BY  Andrus & Starke
Attorneys

United States Patent Office 3,105,717
Patented Oct. 1, 1963

3,105,717
BODY-TO-FRAME MOUNTING
Arnold G. Schilberg, deceased, late of Milwaukee, Wis., by Irene G. Schilberg, administratrix, Milwaukee, Wis., assignor to A. O. Smith Corporation, Milwaukee, Wis., a corporation of New York
Filed Dec. 15, 1961, Ser. No. 160,426
1 Claim. (Cl. 296—35)

This invention relates generally to motor vehicles having separate body and frame assemblies and particularly related to the mounting of the body to the frame.

In mounting a vehicle body to the frame, it is desirable that there be sufficient rigidity in the mounting to permit the body and frame to effectively mutually reinforce and complement one another to permit a lightweight overall vehicle construction. At the same time, however, in order to dampen frame shocks and vibrations and provide a more comfortable, noiseless ride, there must be some measure of flexibility or resiliency in the mounting.

Ordinarily, in the past, the mounting has represented a compromise of these considerations. Thus, for example, rubber blocks or shims of high hardness have been utilized and while allowing for some dampening of road shocks and vibrations, because of their stiffness, these blocks prevented attainment of completely satisfactory riding characteristics. Then too, the body and frame were not capable of cooperating fully in resisting loads with these shims and both had to be made heavier than they would if the shim were completely rigid.

The present invention is based upon the finding that body and frame can work together in resisting common loads quite effectively and yet be insulated from one another against vibrations, shocks and the like to an acceptable level if the mountings therebetween are made rigid in one plane only.

For this purpose, the invention provides in combination with conventional rubber shims which are bolted between the body and frame, a connector consisting of a relatively thin strip of spring steel or the like. The connector is affixed at one end between a shim and the frame or body while its other end is secured rigidly to the other frame and body. This connector, by reason of its design, acts as a flexible spring in one direction but when loaded normal thereto, is quite stiff and inflexible. Thus, assuming the body and frame are to be attached vertically to one another, a number of rubber shims which may be quite "soft" are interposed at each of a number of predetermined locations on the vehicle. These shims provide vertical control and act to dampen frame shocks and vibrations from the body, giving the vehicle as a whole smooth, quiet riding characteristics. The connectors are then placed at similar locations between body and frame and attached rigidly therebetween, either longitudinally or transversely of the body and frame as desired. Under vertical loads, these connectors act as flexible springs and, in effect, are over-ridden by the rubber shims. However, these connectors provide a highly stiff horizontal shear attachment between body and frame, enabling the body and frame to in effect act as a single structural unit in resisting horizontal loads. There thus is provided means for assuring an improved, all-around attachment between body and frame and which enables stiffness without loss of flexibility and vice versa.

The connectors of the invention may be employed between horizontally spaced body and frame components, between front sheet metal and frame and between front sheet metal and body, in vertically, horizontally or transversely extending position as desired to give the exact type of control desired at any given point.

The connectors are simple in construction as well as easy to install and replace.

Figure 2:
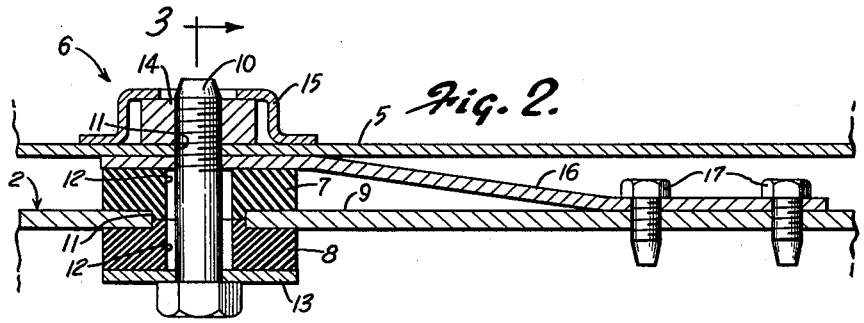
Figure 4:
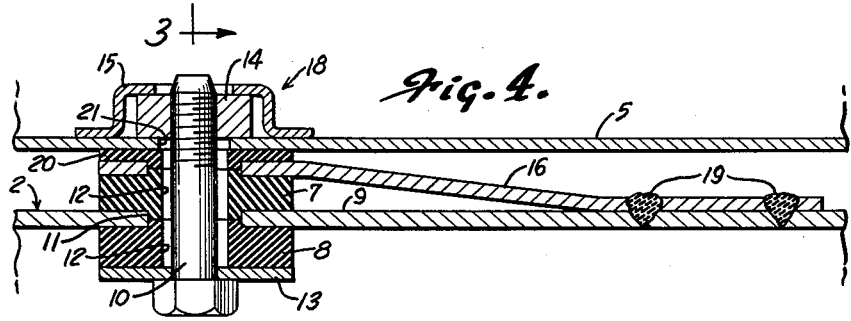
Figure 3:
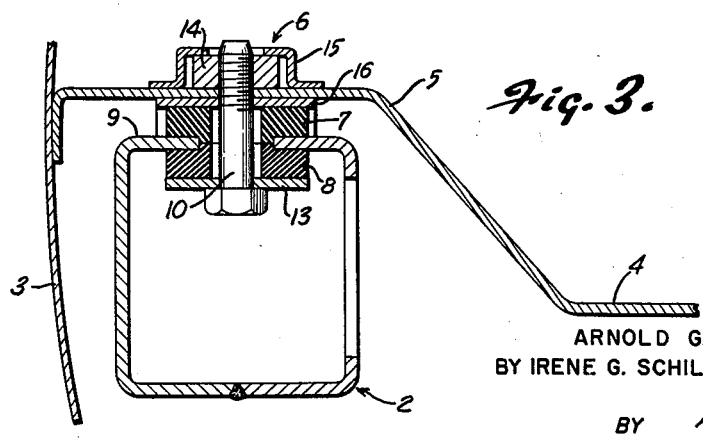

The drawing furnished herewith illustrates the best mode presently contemplated of carrying out the invention.
In the drawing:
FIG. 1 is a cross sectional view of a motor vehicle embodying the improved mountings of the invention with the vehicle body being shown in phantom;
FIG. 2 is a longitudinal section of the frame and body through an attachment point showing the detailed construction of the mountings of the invention;
FIG. 3 is a transverse section of the body and frame taken along the lines 3—3 of FIG. 2; and
FIG. 4 is a view similar to FIG. 2 showing an alternative form for the mountings of the invention.

Referring to the drawing and particularly to FIGS. 1 to 3, a motor vehicle 1 incorporating the improved mounting system of the invention includes a pair of box section frame side rails 2 and a separate sheet metal body member 3 shown in outline form only. The body 3 includes the usual floor pan 4 having flanged edge portions 5 which are extended upwardly and outwardly over the side rails 2.

A body-to-frame mounting assembly 6 formed according to the invention is shown on either side of the vehicle and as they are identically formed, only one will be described in detail herein. The mounting assembly 6 includes a pair of rubber shims 7 and 8 with shim 7 being disposed between the top surface 9 of rail 2 and floor pan 4 to control vertical upward deflection of the side rail while shim 8 is disposed on the underside of the surface 9 in line with upper shim 7 to check rebound of the frame. Shims 7 and 8 are secured in place by a vertical fastening bolt inserted upwardly through the registering openings 11 provided in side rail surface 9 and floor pan 4 and through the openings 12 in the shims. A washer 13 is inserted between the head of the bolt 10 and the corresponding surface of the lower shim 8 and a suitable nut 14 is threaded to the opposite end of the bolt to draw shims 7 and 8, side rail 2 and floor pan 4 into tight bearing relation with one another. Any possible loosening of the assembly during vehicle operation is prevented by a sheet metal nut cage 15 secured to the floor pan 4 around the nut 14 as shown.

In actual practice, shims 7 and 8 are desirably made quite flexible to provide maximum damping of frame vibrations and cushioning of frame shock loads from the body, thus enabling a soft, quiet ride. However, the shims in and of themselves, prevent the body and frame from effectively complementing one another strengthwise under loading. In accordance with the invention, therefore, the mounting assemblies 6 further include a connector plate 16 formed of a relatively thin, elongated strip of spring steel. The connector plate 16 extends longitudinally of the vehicle in the illustrated construction and has one end apertured and secured between upper shim 7 and floor pan 4 by bolt 10. The opposite end of connector plate 16 is secured rigidly to upper surface 9 of side rail 2 aft of the shims by any suitable means such as the self-threading metal screws 17 shown.

Relative to vertical loads upon the frame and body, the connector plate 16 acts as a spring and has a fairly high flexure characteristic, thus enabling the flexibility of the attachment to remain quite high and for all practical purposes limited only by the resiliency shims 7 and 8. However, relative to horizontal loads either longitudinally or transversely of the frame, the connector by reason of its construction has very little "play" or resiliency and effectively limits relative movement between the body and frame. In effect then, the body and frame act as a single structural unit responsive to horizontal loads and as a result are able to complement one another to a high degree in resisting such loads. The body and frame may as a consequence be made somewhat lighter weight overall than with a more flexible type attachment and this is achieved without sacrifice of the riding characteristics of the vehicle.

As stated, the connector extends longitudinally of the frame and body but it may be turned 90 degrees to extend transversely thereof with equal results. This of course, entails moving the shims and body attachment point inboard of the rail.

Another embodiment of the invention is shown in FIG. 4 of the drawing and differs from the first embodiment mainly in that means are provided to allow for slight movement between the body and frame in the horizontal plane. In this embodiment, parts of identical construction to parts of the first illustrated embodiment are given corresponding numbers.

The body-to-frame mounting 18 includes the shims 7 and 8 fastened on either side of side rail surface 9 by bolt 10 as described earlier. One end of connector plate 16 is fastened between the upper shim 7 and floor pan 4 by bolt 10 while the opposed end of plate 16 is secured to side rail 2 by the plug welds 19 to illustrate an alternative securement. In this instance, the bolted end of plate 16 is insulated from floor pan 4 by a thin rubber disc 20 held in place by bolt 10 as shown. Disc 20 serves to prevent metal-to-metal contact and provides an increased dampening of frame vibrations in comparison with the earlier described embodiment.

In this embodiment, an annular clearance 21 is provided between floor pan 4 and bolt 10 to allow controlled horizontally shifting movement relatively between the frame and body members in either direction and to provide a somewhat more flexible all-around connection than the first form of the invention. This particular mounting 18 might be used to advantage, for example, where it is desired to reduce the stress level in the body and frame as such a mounting would allow the frame and body to shift horizontally relatively of one another within the limits permitted by the clearance 21 as in cornering of the vehicle. Such a mounting might also be used where the body to frame attachment is horizontal rather than vertical as illustrated. In such an instance, the mounting would allow limited vertical shifting movement between the body and frame and, as a result reduce the harshness of the ride somewhat. In actual practice, the two embodiments of the invention preferably would be employed together to give the exact type of control desired throughout the vehicle.

The invention represents a simple, inexpensive means for obtaining improved structural cooperation between the body and frame of a vehicle while at the same time preserving sufficient flexibility therebetween to absorb and dampen vibrations and produce desirable riding qualities. The connectors may also be applied between the body and front end sheet metal and between frame and front sheet metal as desired to provide the type of controlled movement between the connected parts as desired.

Various modes of carrying out the invention are contemplated as being within the scope of the following claim particularly pointing out and distinctly claiming the subject matter which is regarded as the invention.

I claim:

A body-to-frame mounting, comprising a shim of elastomeric material interposed between the body and frame, bolt means inserted through said shim and connected between said body and said frame, and an elongate metal strap connected at one end to said shim by said bolt means and connected at the opposed end to one of the body and frame, said strap controlling body and frame deflection relatively of one another in the plane of said strap and said shim controlling deflection in the plane normal thereto to provide a mounting having high stiffness in one plane and high resiliency in the plane normally thereof.

References Cited in the file of this patent

UNITED STATES PATENTS

| | | |
|---|---|---|
| 1,912,451 | Hibbard | June 6, 1933 |
| 2,838,339 | Schaldenbrand | June 10, 1958 |

FOREIGN PATENTS

| | | |
|---|---|---|
| 566,855 | Great Britain | Jan. 17, 1945 |
| 1,089,284 | Germany | Sept. 15, 1960 |